United States Patent Office 3,080,025
Patented Mar. 5, 1963

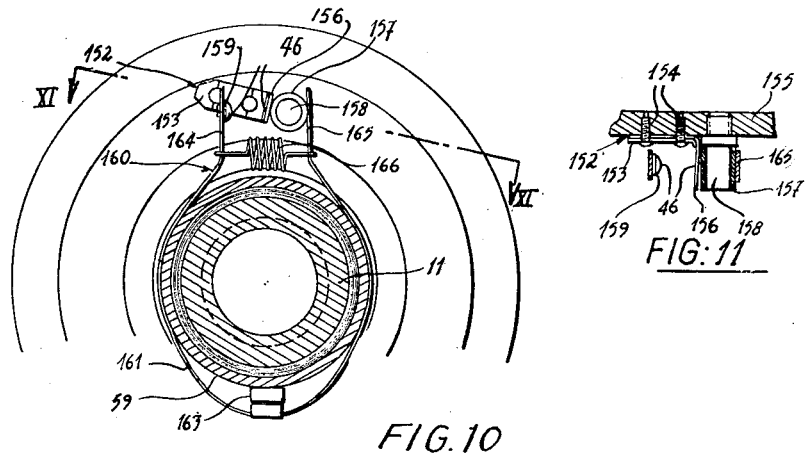
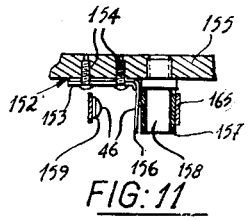
FIG.10
FIG:11
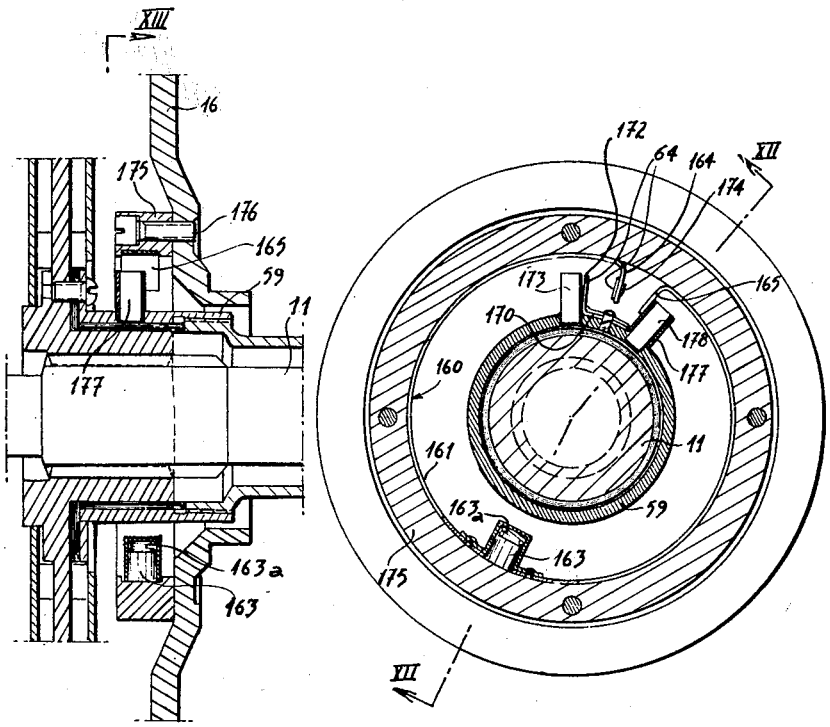
FIG: 12
FIG: 13

3,080,025
MOTION TRANSMISSIONS, ESPECIALLY RELATING TO CLUTCHES FOR ENGAGEMENT IN SYNCHRONISM
Jean Maurice, Paris, France, assignor to Societe Anonyme Francaise du Ferodo, Paris, France, a corporation of France
Filed Jan. 22, 1960, Ser. No. 4,038
Claims priority, application France Jan. 30, 1959
7 Claims. (Cl. 192—.092)

One of the objects of the present invention is an automatic clutch control for an automobile vehicle, characterized in that the declutching which is effected solely by the action of the driver on the gear-changing lever, is then removed from that action and is so maintained as long as the driving shaft of the clutch is rotating at a lower speed than the driven shaft, an automatic acceleration device of the engine being controlled by a signal which indicates that, simultaneously, the clutch has been released by the action of the driver on the gear-changing lever and the driving shaft is rotating at a lower speed than the driven shaft, and also characterized in that the coupling of the automatic engine acceleration device to the butterfly valve of the carburettor and the coupling of the accelerator pedal to the said butterfly of the carburettor are arranged with respect to each other in such manner that action on the said pedal controls the engine in such a sense as to assist the synchronization of the said shafts.

With a control system of this kind, the driver always remains in control of his accelerator, the automatic system only coming into operation if the driver does not act correctly when changing gears, while the engine braking is always available under excellent conditions whenever it is required.

The present invention also relates to a synchronizing device which actuates an electric switch when the speed of one shaft becomes greater than the speed of another shaft concentric with the first, a device of this kind being capable of use within the framework of the control described above, or independently of the said control.

In accordance with the invention, a synchronizing device of the type referred to is especially characterized in that a pair of jaws is frictionally engaged against a member fixed for rotation with one of the shafts, and carries a conducting contact which co-operates with a contact fixed for rotation with the other shaft, the travel of the jaws between the positions of opening and closing of the switch being defined by a stop device which comes into operation when the shafts are rotating at different speeds.

The various objects, features and advantages of the invention will further be brought out in the description which follows below of forms of embodiment of the invention selected by way of example, reference being made to the accompanying drawings, in which.

Figure 2:
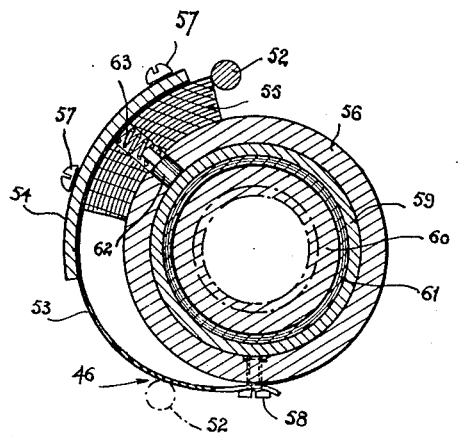
FIG. 2 is a partial view of one of the parts of this control, adapted to the said clutch, in transverse cross-section taken along the line II—II of FIG. 1.

FIGS. 6, 7, 8 and 9 relate respectively to various alternative forms of the diagram of the control system;

FIG. 10 is similar to FIG. 2, but relates to an alternative form of the corresponding element of the control;

FIG. 11 is a partial view of this alternative, in cross-section taken along the line XI—XI of FIG. 10;

FIG. 12 relates to still a further alternative form of this element of the control, in cross-section taken along the line XII—XII of FIG. 13;

FIG. 13 is a corresponding view in cross-section along the line XIII—XIII of FIG. 12.

The form of embodiment shown in FIGS. 1 to 5 relates by way of example to an application of the invention to a centrifugal clutch of the type known by the name of "Ferlecgravina."

Figure 1:
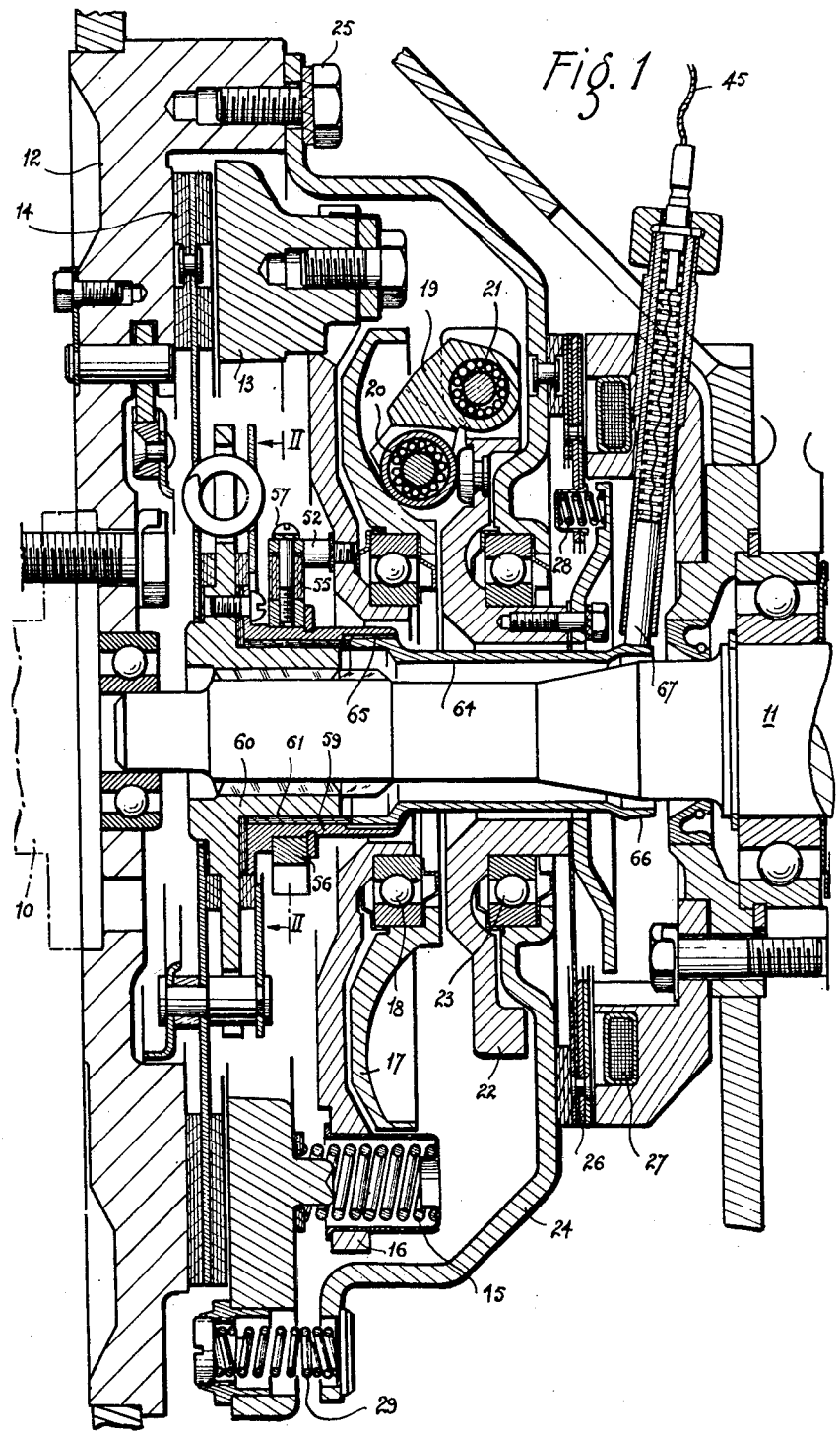
FIG. 1 is a general view in longitudinal cross-section of a centrifugal clutch equipped with a control in accordance with the invention.

There can be seen in FIG. 1, at 10 the crankshaft of the engine of the vehicle which forms the driving shaft of the clutch, and at 11 the driven shaft of the clutch which forms the input shaft of the gear-box of the vehicle.

The shaft 10 carries the fly-wheel 12, with which co-operates a pressure plate 13 mounted fast for rotation and free for lateral movement, so as to grip a friction disc 14 coupled to the driven shaft 11. To this end, the plate 13 is pushed, through the intermediary of compression springs 15, by a transfer-plate 16 on which a cam 17 is mounted by means of a bearing 18. Weight-heads 19, rolling at 20 on the cam 17, are pivoted at 21 on a weight-head carrier 22 which is mounted by means of a bearing 23 on a casing 24 which is fixed at 25 to the fly-wheel 12. The weight-head carrier 22 is fixed for rotation with the armature 26 of a fixed immobilizing electro-magnet 27.

If the electro-magnet 27 is de-energized, the armature 26 is forced by springs 28 against the casing 24, which causes the weight-head carrier 22 to be rotated at the speed of the engine. A centrifugal thrust is transmitted axially at 17—16—15 to the plate 13 which forces the friction disc 14 against the fly-wheel 12, the transmissible torque, which is nil when the engine is idling, being increased as the engine speed increases. When the electro-magnet 27 is excited, it immobilizes the armature 26 and therewith the weight-head carrier 22. The transmissible torque at 12—14—13 is nil. Return springs 29 ensure rapid disengagement when the engine is idling or when the electro-magnet 27 is excited. In the example shown in FIG. 1, the springs 29 have the particular feature that they act in tension between a casing 24 and the plate 13.

The electro-magnet 27 (FIG. 5) has one of its terminals connected to earth at 30, while its other terminal is supplied from the battery B of the vehicle by a conductor 31 which comprises a switch 32. The latter is actuated by a relay, the coil 33 of which has one terminal connected at 34 to the conductor 31, while its other terminal is connected to earth through a conductor 35 comprising a switch 36.

This switch 36 is responsive to the condition of holding or release of the gear-changing lever by the driver. It is closed when the driver grips this lever and is opened when the driver releases the lever.

A conductor 37, connected at 38 to the conductor 35 and connected to earth at 39, comprises two switches 40 and 41 in series. The switch 40 is coupled to the switch 32 and like the latter switch is actuated by the relay 33. The switch 41 is actuated by a further relay, the coil 42 of which has one terminal connected to a conductor 43 which is coupled at 44 to the conductor 31, while its other terminal is connected to earth by a conductor 45 comprising a switch 46.

The switch 46, responsive to the fact that the driven shaft 11 is rotating faster or more slowly than the engine shaft 10, constitutes an indicator of the relative speed of the shafts 10 and 11. It is closed when the driven shaft 11 rotates faster than the driving shaft 10 and is open in the contrary case.

The relay 42 actuates, in addition to the switch 41, a further switch 47 which is coupled to this latter. The switch 47 is mounted on a conductor 48 which is connected at 49 to the conductor 43 and to earth at 50, and comprises an electro-magnet 51. The latter is intended to cause the forced opening of the butterfly valve of the carburettor of the vehicle.

The construction relative to the switch 36 of the gear-changing lever may be of the type described in the United States Patent No. 2,846,036, or of any other appropriate type, and will not be described in detail in the present text.

On the other hand, detailed examples of construction in connection with the switch 46 and the electromagnet 51 will be described hereunder.

Reference will again be made to FIG. 1 and also to FIG. 2, in which is shown an example of assembly of the switch 46. The switch contact stud which is connected to earth is formed by a finger 52 screwed into the fly-wheel side of the transfer plate 16 of conducting metal, the whole of the clutch being connected to earth. The other stud, namely the supply stud, is constituted by a flexible blade 53 which is gripped over a substantial length, at one of its extremities, between a conducting arcuate plate 54 and an insulating block 55 mounted on a conducting ring 56 by means of screws 57 which pass through the plate 54, the blade 53, the block 55, and are screwed into the ring 56 so as to ensure both the fixing of the parts 54, 53 and 55 to the ring 56 and also the electric connection of the blade 53 to the ring 56. The other extremity of the blade 53 is forked and is slidably engaged under the head of a screw 58 which is screwed into the ring 56.

The ring 56 is mounted slidably in rotation on a conducting sleeve 59 fixed round the hub 60 of the disc 14 from which it is insulated by means of an insulating sleeve 61. A brush 62, pressed by a spring 63 and mounted inside the ring 56, is applied against the sleeve 59 so as to provide a suitably-adjusted frictional relation between the ring 58 and the sleeve 59. A trumpet 64 screwed at 65 on the sleeve 59 extends towards the rear round the driven shaft 11 and into the interior of the weight-head carrier 22. At its extremity 66 it is formed as a collector ring which receives a contact brush 67 connected to the conductor 45.

The finger 52, fixed to the plate 16, rotates at the speed of the driving shaft 10. The assembly 56—55—54—53 rotates at the speed of the driven shaft 11 by virtue of the friction at 62, if no obstacle prevents this. The finger 2 constitutes precisely an obstacle of this kind in the following manner: if the driven shaft 11 rotates at a lower speed than the shaft 10, the finger 52 comes into abutment with the insulating block 55; the switch 46 is opened. If the driven shaft 11 rotates faster than the shaft 10, the finger 52 is applied against the free portion of the blade 53 and then comes up against the plate 54. The switch 46 is closed.

Figure 3:
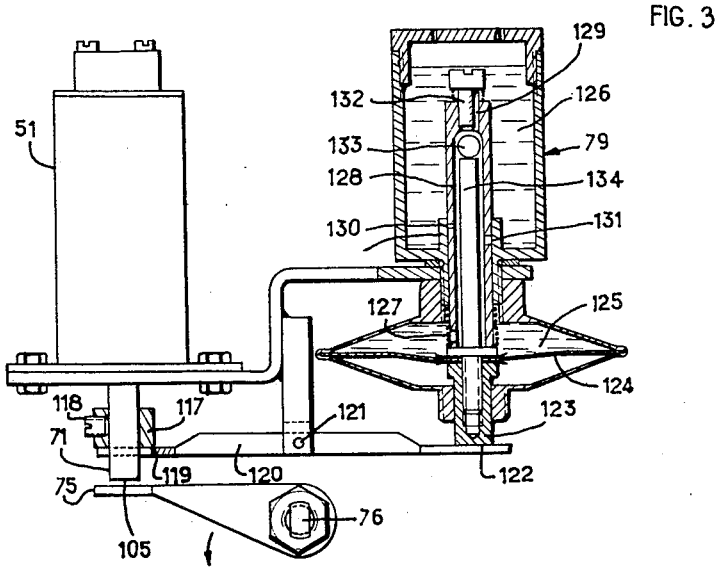
FIG. 3 is a view of a device for causing the spindle of the butterfly valve of the carburettor to rotate under the action of an electro-magnet of the control according to the invention and under the action of a fluid resistance.
Figure 4:
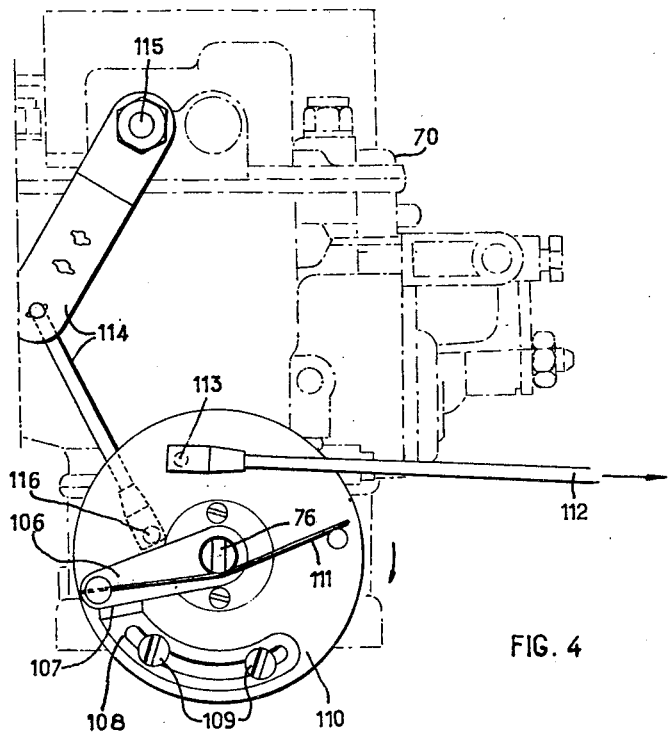
FIG. 4 is a further view of this device looking on the side opposite to the carburettor.

Reference will now be made to FIGS. 3 and 4, in which is shown an example of the electro-magnet device 51. The body of the electro-magnet 51 is fixed on the carburettor 70. Its plunger core 71 abuts at its end at 105 against a lever 75 which is rigidly fixed to the spindle 76 of the butterfly-valve of the carburettor. As can be seen from FIG. 4, the spindle 76 is operated from the accelerator pedal through a lever 106 mounted on the spindle 76 and co-operating in abutment at 107 with a member 108. The latter is adjustably mounted by means of screws 109 on a disc 110 freely mounted for rotation about the spindle 76. There is shown at 111 a return spring acting between the lever 106 fixed to the spindle 76 and the disc 110. The link-rod system 112 actuated by the accelerator pedal is pivoted at 113 on the disc 110, while the crank-rod system 114 actuating the supply pump, the shaft of which is shown at 115, is also pivoted on the disc 110. An articulation of this kind can be seen at 116.

The core 71 of the electro-magnet 51 is further provided with a collar 117 which can be regulated by means of a screw 118 and which co-operates in abutment at 119 with the extremity of a lever 120. The latter is pivoted at its central part at 121 on the carburettor, and the other extremity co-operates in abutment at 122 with a piston 123 of a moderator or slowing-down device 79 of the dash-pot type. The piston 123 is rigidly fixed to a diaphragm 124, behind which a chamber 125 containing a fluid, for example gas-oil, communicates with a tank 126 by a succession of control orifices. These orifices comprise on the one hand an orifice 127 serving as a fluid inlet to the chamber 125 in a hollow axial column 128 rigidly fixed to the piston 123 and to the diaphragm 124, and on the other hand orifices 129, 130 and 131, which act in stages for the admission of the fluid from the column 128 to the tank 126. The orifice 129 is formed by a longitudinal slot formed in a screw 132 screwed into one end of the column and partly masked by the lifting of a ball 133 caused by the setting into motion of the fluid. In its inactive position, the ball 133 rests on the upper extremity of a rod 134 rigidly fixed to the piston 123 and extending into the interior of the hollow column 128. It is the adjustment of the screw 132 which determines the space formed with respect to the ball 133, and in consequence the rate of flow through the slot 129. In addition, it will be noted that between the moment at which the ball 133 begins to move and the instant at which it touches the screw 132, there exists a dead period between which the unregulated flow is greater than the regulated flow provided by the slot 129. To this dead period, there corresponds however in a desired manner before the operation of the butterfly-valve, an inoperative travel of the plunger 71 produced by a sufficient clearance formed at 105 between the members 71 and 75, while the parts 117 and 119 are already in contact. Thus, as soon as the lever 75 operates, the core 71 is braked in an exactly pre-determined manner by the forced passage of the fluid at 129, with the application of the ball 133. The other orifices 130 and 131 are formed in the body of the column 128, and are successively uncovered by a hollow centre boss 134 in the tank 126 as and when the assembly 122—123—128 rises. Thus, the braking effected by the dash-pot 79 is first of all considerable and then becomes progressively smaller.

When the electro-magnet 51 is de-energized, the carburettor 70 functions in the usual manner, that is to say under the complete control of the driver. Action on the rod 112 causes rotation of the disc 110 and, by means of the abutment at 107, rotation of the lever 106 which corresponds to rotation of the spindle 76 of the butterfly-valve. It will be noted that the crank-rod system 114 of the supply pump, which is coupled at 116 to the disc 110, is driven by action of the rod 112.

When the electro-magnet 51 is excited, the core 71 causes opening of the butterfly valve even if the driver lifts his foot from the accelerator. This forced opening does not limit the opening which the driver could control for his part by reason of the one-way coupling at 105. It does not therefore act in opposition to the will of the driver and only intervenes in the manner described if the driver is passive and releases his foot from the accelerator. It will be noted that the action of the electro-magnet 51 does not result in any displacement of the crank-rod system 114 of the supply pump. It will also be noted that the acceleration caused by the electro-magnet does not result in any depression of the pedal which can be felt by the driver. The forced opening is carried out slowly by reason of the resistance offered by the dash-pot 79 and more exactly, very slowly at first during the passage of fluid at 129 and thereafter less slowly during the passage of the fluid at the same time at 129 and 130 and then at 129, 130 and 131. On the other hand, there is nothing to prevent the return travel of closure from being instantaneous due to the action of the elastic restoring means associated with the carburettor.

The operation of the device of FIGS. 1 to 5 is as follows:

As long as the driver does not take hold of the gear-changing lever, the switch 36 is open, the relay 33 is de-energized, the two switches 32 and 40 are open, all the electric installation is at rest, and in particular the electro-magnet 27 which leaves the clutch under the sole control of the engine speed, that is to say engaged when that speed is sufficient.

When the driver grips the gear-changing lever in order to change gear, the switch 36 closes, which excites the relay 33 and closes the switches 32 and 40, thus exciting the electro-magnet 27. The clutch is immediately disengaged. At the same time, the relay 42 is set, and it is only necessary for the switch 46 to close in order that the relay 42 can be excited to close the two switches 41 and 47.

Now, at the moment when the driver grips the gear-changing lever to change gear, he releases the accelerator pedal. As the clutch disengages and the vehicle continues on its way, the speed of the engine falls away towards the idling speed, and the speed of the shaft 10 becomes less than that of the shaft 11, which closes the switch 46. Then the two switches 41 and 47 close, and this constitutes a kind of signal to which the acceleration means of the engine will respond.

The closure of the switch 41 has the effect of keeping the relay 42 excited as long as the closure subsists, even if the driver causes the switch 36 to open by releasing the gear lever as soon as the new gear has been engaged.

The closure of the switch 47 has the effect of exciting the electro-magnet 51 and of causing an increase in the speed of the engine, even if the driver keeps his foot off the accelerator pedal. At the precise moment when the speed of the shaft 10 overtakes that of the shaft 11, the switch 46 closes and de-energizes the relay 42. The two switches 41 and 47 open, the first ensuring an immediate re-engagement of the clutch in synchronism, and the second stopping the forced increase in the speed of the engine, which then has no further purpose.

An arrangement of this kind enables any skidding of the driving wheels of the vehicle to be prevented at the moment of re-engagement, especially after a changing-down of gear, since the re-engagement is effected between two shafts 10 and 11 which are rotating at the same speed, and it enables the benefits of the engine braking to be retained by preventing the engine speed from falling to idling speed. It will also be appreciated that the forced opening is effected only if the speed of the driving shaft 10 falls below that of the driven shaft 11. It is not effected if such a fall is not produced either by action of the driver or if the vehicle is climbing a steep slope, or for any other reason. The opening of the butterfly-valve in stages enables this opening to be limited at low vehicle speeds to the value necessary to reach synchronism, thereby preventing any over-running of the synchronous speed and eliminating all shocks when re-engaging the clutch.

Figure 5:
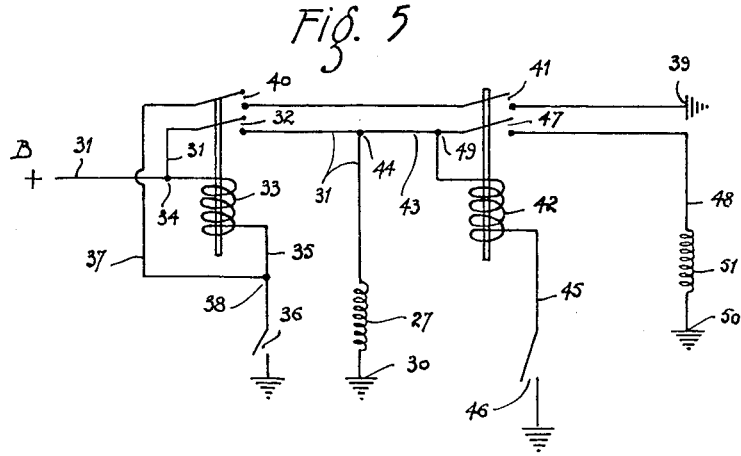
FIG. 5 is a general diagram of the control system.

It will be understood that the invention is applicable not only to clutches of the kind which has been described above, but also to all other clutches and engaging members of clutches, both those in which any kind of power whatever is brought into action for de-clutching—the case which has been more particularly considered in the diagram of FIG. 5, in which such a source of power for de-clutching is exemplified by the electro-magnet 27—and those in which any source of power whatever is brought into action to keep the clutch engaged. Amongst many others, one example of clutches of this second category is the electro-magnetic clutch known by the name of "Ferlec 111," in which the torque transmissible by the clutch increases as the voltage developed across the terminals of its electro-magnet becomes greater.

Figure 6:
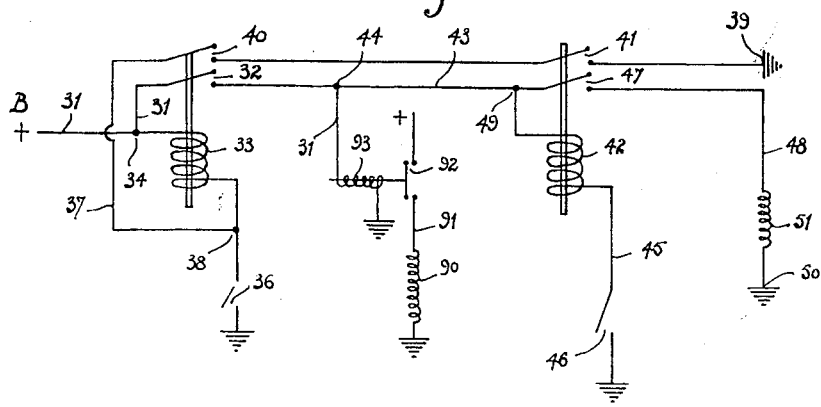

FIG. 6 is a diagram of the control according to the invention, adapted to the "Ferlec 111" clutch. There can be seen at 90 the electro-magnet of the clutch, the circuit 91 of which comprises a switch 92 actuated by a relay. The coil 93 of this relay is substituted for the electro-magnet 27 of FIG. 5, the various other elements of which are applicable to the diagram of FIG. 6.

All other appropriate alternative forms of diagram may also be provided within the scope of the invention, and amongst these alternatives, a few are given below by way of example, in their appliaction to clutches of the type of FIG. 1, with a de-clutching electro-magnet 27.

Reference will first be made to the alternative form of diagram given in FIG. 7, in which there will again be seen at 30 the earth connection of one of the terminals of the de-clutching electro-magnet 27, the other terminal being supplied from the battery B by the conductor 31 comprising the relay contact 32.

In this case, the relay 32 has the feature of having two excitation coils indicated at 33a and 33b respectively. The coil 33a is an energizing coil and has one terminal connected at 34 to the conductor 31, while the other terminal is connected to earth through the intermediary of the switch 36 which is responsive to the condition of holding or release of the gear-changing lever L by the driver.

The other coil 33b of the double relay 33a–33b is a holding coil. It has one terminal connected to the conductor 31 at 100, that is to say on the downstream side of the switch 32, while its other terminal is connected to earth by a conductor 101 comprising the switch 46.

There can be seen at 51 the electro-magnet which is intended to cause an accelerated opening of the butterfly-valve of the carburettor of the vehicle. The electro-magnet 51 is mounted on a conductor 102, which is connected at 103 to the conductor 31 and at 104 to the conductor 101.

The constructions of the switch device 46 and of the electro-magnet device 51 may be similar to those which have been described with reference to FIGS. 1 and 2 and to FIGS. 3 and 4.

Figure 7:
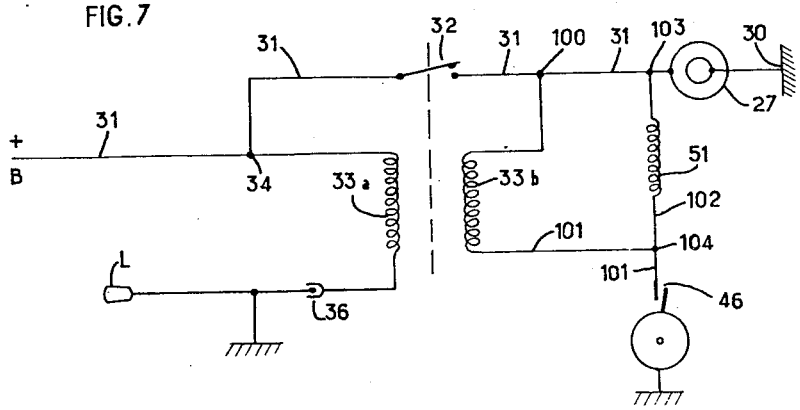

The operation of the device in accordance with the diagram of FIG. 7 is as follows:

As long as the driver does not grip the gear-changing lever, the switch 36 is open, the coil 33a is not energized, and the relay 32 is open. The electro-magnet 27 is not excited, which leaves the clutch under the sole control of the speed of rotation of the engine, that is to say engaged when that speed is sufficient.

When the driver grips the gear-changing lever to change gear, the switch 27 closes which excites the coil 33a and closes the contact 32, thus exciting the electro-magnet 27. The clutch is immediately disengaged. At the same time, the coil 33b is set and it is only necessary for the switch 46 to close in order that the electro-magnet 51 and the coil 33b may be energized.

Now, at the moment when the driver grips the gear-changing lever L to change gear, he releases the accelerator pedal. As the clutch is then disengaged and the vehicle continues on its course, the speed of the engine falls towards idling speed, and the speed of the driving shaft becomes less than that of the driven shaft, which closes the switch 46.

The closure of the switch 46 has the effect of exciting the coil 33b and of maintaining the switch 32 closed, even if the driver causes the switch 36 to open by releasing the gear lever when the new gear has been engaged.

The closure of the switch 46 has also the effect of exciting the electro-magnet 51 and of causing the engine speed to increase, even when the driver keeps his foot away from the accelerator pedal. At the precise moment when the speed of the driving shaft overtakes that of the driven shaft, the switch 46 opens and de-energizes the holding relay 33b. The switch 32 opens which de-excites the electro-magnet 27 and permits an immediate re-engagement in synchronism. The opening of the switch 46 also stops the forced increase in the engine speed which has then no further purpose.

Figure 8:
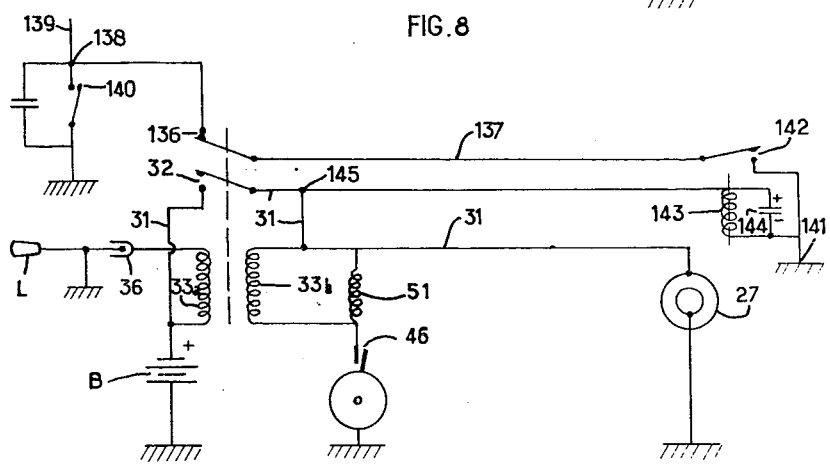

Reference will now be made to FIG. 8, in which the arrangement is similar to that which has been described with reference to FIG. 7. In the arrangement of FIG. 8, the switch 46 of the synchronizing device acts at the moment of synchronism not only so as to render inoperative the acceleration means 51 of the engine, but also to bring into operation a means tending to slow-down the engine, this means intervening in a transient and limited manner in order to maintain the speed of the engine in the vicinity of that of the driven shaft. The said means is preferably provided in the form of an interruption of the ignition.

In the diagram of FIG. 8, there is again seen at B, the battery which supplies the de-clutching electro-magnet 27 by the conductor 31 comprising the switch 32. The latter is always controlled, on the one hand by a relay actuating coil 33a controlled by the switch 36 of the gear-changing lever L, and on the other hand by a holding coil 33b connected at 100 to the conductor 31. There is also seen at 46 the switch of the synchronizing device and at 51 the electro-magnet for accelerating the engine.

In this case, a further contact 136 which is mounted on a conductor 137 is coupled to the contact 32 of the relay 33a—33b. The contact 136 is closed when the contact 32 is open and vice-versa. The conductor 137 is connected at 138 to the circuit 139 connecting the ignition coil to the distributor, in shunt with the ignition device 140 and is connected to earth at 141. The passage of current is controlled by the switches 136 and 142. The switch 142 is controlled by a relay coil 143 shunted by a chemical condenser 144 and supplied by connection at 145 to the conductor 31.

The operation is similar to that which has been previously described. However, at the moment when synchronism of the shafts of the clutch is reached, and when the switch 46 re-opens to cut-off the supply to the coil 33b and to open the switch 32, which renders inoperative the electro-magnet 51 which accelerates the engine and the coil 143, the switch 136 closes while the condenser 144 maintains the closure of the switch 142 for a pre-determined time, for example one-tenth of a second, this closure having been effected by excitation of the relay 33. The continuous earthing of the conductor 137 which is thus ensured for the said period of time, produces a corresponding interruption of the ignition. Thus, the engine is prevented from continuing the acceleration initiated by the electro-magnet 51 beyond the precise moment at which the latter is rendered inactive. In the present form of embodiment with interruption of the ignition, the dash-pot device 79 associated with the electro-magnet 51 can be dispensed with, which accelerates the operation of changing gears. Conversely, with a dash-pot device regulated so as to have a very gradual action, the interruption of the ignition may not be necessary.

Figure 9:
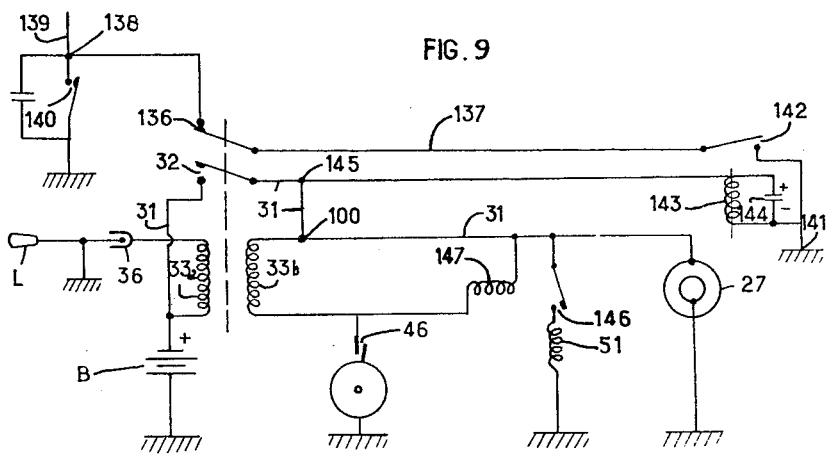

The alternative form of diagram shown in FIG. 9 is identical with that of FIG. 8, except that the electro-magnet 51 is controlled by a relay switch 146 of which the coil is shown at 147. This arrangement enables the current to be reduced in the synchronizing switch 46 and thereby reduces the cost of production of this latter.

Reference will now be made to FIGS. 10 and 11 which concern an alternative form of the switch 46 of the synchronizing device. The contact stud of the switch 46 which is connected to earth is formed by an elbowed arm 152, one of the branches 153 of which is fixed at 154 to a driving portion 155 of the clutch, such as the plate 16 of FIG. 1 for example, while the other branch 156 which forms a contact stud proper, is free while able however to rest against an insulating elastic sleeve 157 passed over a column 158 fixed to the part 155.

The other contact of the switch 46, that is to say the electric supply contact, is constituted by a bead 159 fixed on a blade 160 in the shape of pincers. The said pincers 160 have on the one hand a rounded portion 161 frictionally engaged around the supply sleeve 59 which is fixed for rotation with the driven shaft 11 of the clutch, a brush 163 fixed at the centre of the part 161 rubbing on the sleeve 59 so as to make a perfect electric connection, and on the other hand two projecting end lugs 164 and 165, of which one 164 carries the contact bead 159 while the other 165 is intended to co-operate in abutment against the insulating sleeve 157 which surrounds the column 158. The couplings between the part 161 and the lugs 164 and 165 are rounded so as to avoid all risk of fractures at these points. The grip of the pincers 160 is calibrated by a spring 166 coupled between the lugs 164 and 165, a stay being passed through the spring 166 so as to prevent any excessive deformation of the latter under the action of centrifugal force.

When the driven shaft 11 rotates at a speed less than the portion 155 of the driving assembly, the stop 157—158 comes into contact with the lug 165 (FIGS. 10 and 11). The contact 156 frees the contact bead 159 and the switch 47 is opened. When the driven shaft rotates at a higher speed than the driving assembly, the blade 156 is applied against the contact bead 159, the blade itself being supported by the sleeve 157 of the column 158. The switch 46 is closed. Attention is directed to the simple and robust construction of the synchronizing device of FIGS. 10 and 11, and also to its reliable operation.

Reference will now be made to FIGS. 12 and 13, which relate to still a further alternative form of the synchronizing device. According to this alternative, the pincers are arranged in the interior of the member against which they are in friction contact, and not on the outside of this member. In FIGS. 12 and 13, there can be seen at 170 one of the two contacts of the switch 46 which is shaped to form an elbowed arm similar to the arm 152 of FIGS. 10 and 11, but which in this case constitutes the supply contact and is fixed to the sleeve 59. The free arm 172 which forms the contact stud proper is supported against a column 173 fixed to the sleeve 59.

The other contact of the switch 46, namely the earth contact, is formed by the bead 174 fixed on the pincers-shaped blade 160. The blade 160 has a rounded portion 161 which is in frictional engagement with the inside of a ring 175 fixed at 176 to the plate 16 which forms part of the driving assembly of the clutch. A brush 163 fixed to the centre of the part 161 can be provided to rub against the ring 175 so as to provide an excellent electric connection, a small spring 163a ensuring for example the calibration of this friction. The blade 160 is provided in addition with two projecting lugs 164 and 165 which in this case are directed towards the interior. The lug 164 carries the contact bead 174, while the other lug 165 is intended to co-operate in abutment against an insulating sleeve 177 surrounding a column 178 fixed to the member 59. The application of the pincers 160 against the ring 175 is effected by centrifugal force.

When the driven shaft rotates at a lower speed than the driving shaft, the lug 165 becomes applied against the stop 177—178 (FIGS. 12 and 13). The contacts 174 and 173 are spaced apart and the switch 46 is opened. When the driven shaft rotates more rapidly then the driving shaft, the blade 172 is supported against the column 173 and is applied against the contact bead 174. The switch 46 is closed.

It will be observed that the driving of the circumferential band 160 of FIGS. 12 and 13 by one or the other of the stops 178—177 or 172 is always effected in the direction which facilitates the self-release of this band. The band 160 being inside the member against which it is in frictional contact, the action of centrifugal force on the said band assists the electric contact and avoids all risk of separation. Such action of centrifugal force even enables any spring such as 166 to be eliminated, this spring being provided to grip the band in FIGS. 11 and 12.

The evacuation of heat from the band is effected in FIGS. 12 and 13, for an equal length of band, under better conditions than when the band is on the outside as in FIGS. 10 and 11. It should be noted that the extremities of the band of FIGS. 12 and 13 can be folded back so as to increase their mechanical strength, in particular in the form of an open or closed hairpin.

It will of course be understood that the invention is not limited to the forms of embodiment described and shown, but includes all alternatives.

What I claim is:

1. In an automobile vehicle having an engine, an accelerator pedal, a gear shift lever, a carburetor with a butterfly valve, an engine driving shaft, a driven shaft, and a clutch for connecting and disconnecting said shafts, a control device comprising declutching means operated by the action of the driver of the vehicle on said gear-shift lever for disengaging said clutch, speed comparing means operatively connected with said shafts for controlling said declutching means, automatic accelerating means operatively connected with the speed comparing means and acting on said butterfly valve for accelerating the engine and thereby increasing the driving shaft speed, first one-way coupling means between the accelerator pedal and the butterfly valve, and second one-way coupling means between the automatic accelerating means and the butterfly valve, whereby re-engagement of the clutch after release of the lever is prevented as long as the driving shaft speed is lower than the driven shaft speed and is effected as soon as a sufficient increase of the driving shaft speed has been produced by the action of said accelerator pedal or of said automatic accelerating means, whichever acts first.

2. An automatic control device as defined in claim 1 wherein said automatic accelerating means comprises an electromagnet mounted on the carburetor and having a movable control core, said butterfly-valve having a spindle, a first lever rigid in rotation with said spindle, said first one-way coupling means having first abutment means between said core and said first lever, a disc journalled around said spindle, a projection on said disc, a second lever rigid in rotation with said spindle, said second one-way coupling means having connecting means for connecting said pedal with said disc and second abutment means between said projection and said second lever.

3. An automatic control device as defined in claim 2, further comprising a supply pump for said carburetor, and control means for said pump having connecting means between said disc and said pump.

4. An automatic control device as defined in claim 2 further comprising securing means for securing said projection on said disc, said securing means having adjusting means for adjusting angular position of said projection on said disc.

5. An automatic control device as defined in claim 2 further comprising dash-pot means operatively connected with said core.

6. An automatic control device as defined in claim 1 wherein said declutching means comprises a first coil means fed by a power source through a first switch means, a second coil means controlling said first switch means, a second switch means responsive to actuation of said gear-shift lever for controlling said second coil, and a third switch means responsive to said speed comparing means and over-riding said second switch means.

7. An automatic control device as defined in claim 1 further comprising an ignition system for said engine, and means controlled by said speed comparing means for rendering said system inoperative.

References Cited in the file of this patent
UNITED STATES PATENTS

| | | |
|---|---|---|
| 2,116,842 | Metcalf | May 10, 1938 |
| 2,703,636 | Long | Mar. 8, 1955 |
| 2,741,350 | Dodge | Apr. 10, 1956 |
| 2,747,707 | Dillinger | May 29, 1956 |
| 2,816,187 | Smith | Dec. 10, 1957 |
| 2,920,156 | Price et al. | Jan. 5, 1960 |